United States Patent [19]

Fukuda et al.

[11] 4,240,139
[45] Dec. 16, 1980

[54] ADDRESS GENERATING SYSTEM

[75] Inventors: Yasuo Fukuda, Higashimurayama; Michio Arai, Kawasaki; Hidemi Yamamoto, Kunitachi, all of Japan

[73] Assignee: Tokyo Shibaura Denki Kabushiki Kaisha, Japan

[21] Appl. No.: 942,452

[22] Filed: Sep. 14, 1978

[30] Foreign Application Priority Data

Sep. 22, 1977 [JP] Japan .................... 52-113233
Sep. 22, 1977 [JP] Japan .................... 52-113234

[51] Int. Cl.³ ............................................ G11C 8/00
[52] U.S. Cl. ................................................ 364/200
[58] Field of Search ... 364/200 MS File, 900 MS File

[56] References Cited

U.S. PATENT DOCUMENTS

| 3,737,867 | 6/1973 | Cavin et al. | 364/200 X |
| 4,107,774 | 8/1978 | Joyce et al. | 364/200 |
| 4,117,536 | 9/1978 | Bodner | 364/200 |

Primary Examiner—Thomas J. Sloyan
Attorney, Agent, or Firm—Finnegan, Henderson, Farabow, Garrett & Dunner

[57] ABSTRACT

A data processor includes a base register for a base address modification and a program counter for a relative address modification. An instruction executed in the data processor includes an operation code, a first operand, an address modification judgement bit, an index address modification field, a base address modification field and a displacement. When the instruction is fetched, it is arranged in an address modification and a base modification according to the address modification judgement bit. In the case of the relative address modification, the contents of the program counter is added to the contents of the displacement. In the case of the base address modification, the contents of the base register specified by the base address modification field is added to the contents of the displacement. In the relative address modification and the base address modification, the contents of the general register specified by the index address modification is added to the results of the addition, thereby to form an effective address.

9 Claims, 15 Drawing Figures

F I G. 13A
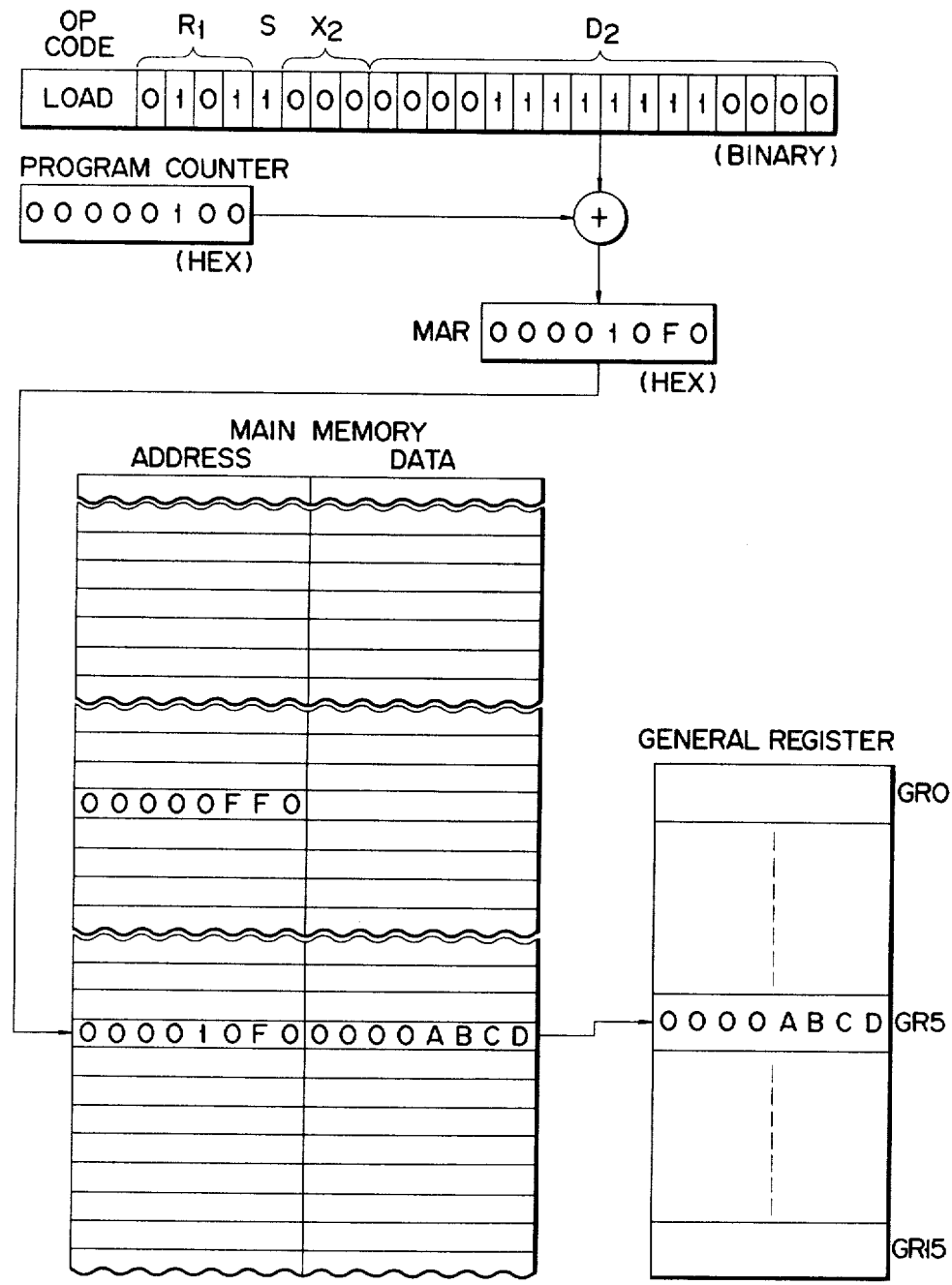

F I G. 13B
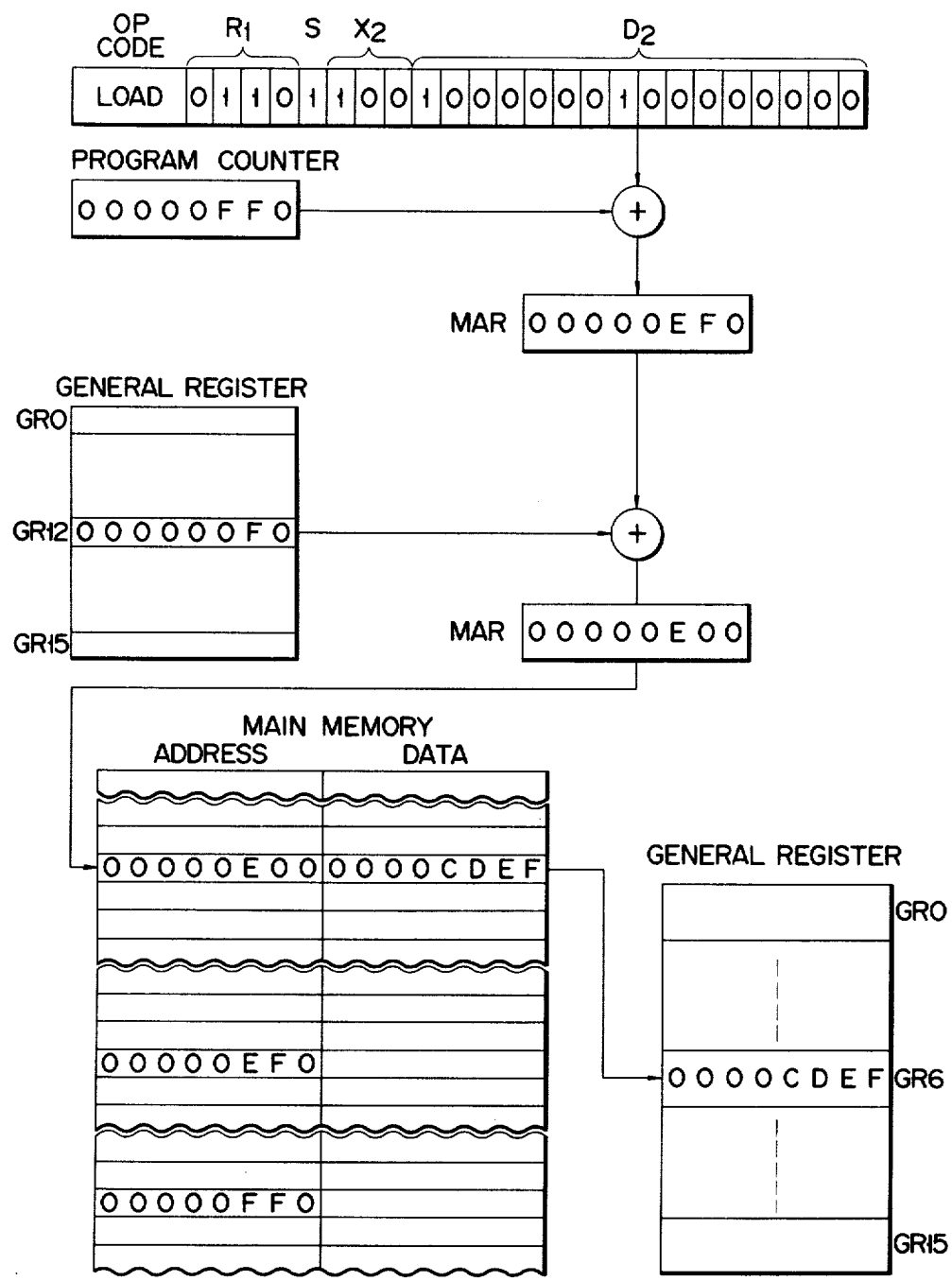

ADDRESS GENERATING SYSTEM

BACKGROUND OF THE INVENTION

The invention relates to an addressing of a data processor.

There has been known some addressing such as a direct addressing, an indirect addressing and a relative addressing. Recent remarkable development of computer technology finds wide and various kinds of applications of computer and necessitates further development of the related software. To fulfill such requirements, it is necessary to employ an instruction system by which coding is easy in programming. Address modification is one of the factors which determine the ease of programming.

Referring now to FIG. 1, there is shown a block diagram of a typical conventional data processor. In the figure, a main memory 11 is coupled with a memory bus (M-BUS) 12 through which data passes to and from the main memory 11. A memory address register (MAR) 13 temporarily stores an address to make an access to the main memory 11. A memory data register 14 temporarily stores data to be loaded or read out to and from the main memory 11. Data transferred to the respective registers passes through a source bus (S-BUS) 15. An instruction register (IR) 16 temporarily stores an instruction read out from the memory 11. A program control unit (MCU) decodes the operation code in an instruction word stored in the IR 16 and controls a microprogram in accordance with the instruction. The microprogram uses a working register (WR) 18. A general register 19 consists of 16 general registers GR0 to GR15. An arithmetic and logic unit (ALU) 20 performs various operations. A quotient register (QR) is designated by reference numeral 21. A program status word (PSW) 22 stores a permission or inhibition information of interrupt or condition flags etc. when an operation is executed. A program counter 23 (PC) stores the address of an instruction to be next executed. A destination bus (B-BUS) 24 permits data from the various registers to pass therethrough.

FIG. 2 shows the format of an instruction executed in the data processor shown in FIG. 1. An instruction to operate a computer as a data processor generally consists of control information composed of an operation code and an operand by which various functional devices of the computer are operated.

The instruction shown in FIG. 2 consists of 32 bits, for example. An operation code 26 is assigned to a field of bit 0 to bit 7 in the instruction. A first operand 27 is assigned to bit 8 to bit 11 and any one of the general registers GR0 to GR15 is specified for the destination register by the first operand. An index address modification field 28 is assigned to bit 12 to bit 15. Any one of the general registers GR0 to GR15 is specified in the index address modification field 28. A displacement 29 is assigned to bit 16 to bit 31. A logical address is specified in the displacement 29.

In operation, the contents of the general register 19 (one of GR0 to GR15) specified by the index address modification field 28 is added to the logical address specified by the displacement 29, as shown in FIG. 3. The result of the addition is loaded into the MAR 13 while data is read out from the main memory 11 and then is loaded into the MDR 14. The instruction is executed in accordance with the operation code and the result of the operation is loaded into the general register specified by the first operand R1 27. In the data processor, the memory is fixedly related to the program so that mapping hardware is necessary for program relocation. The paging is one of possible methods to relocate a program. In this case, a table is used which tabulates the pages of program and the blocks on the memory where the corresponding pages are located respectively. The relation of the address of the program, i.e. logical address, with the address of the main memory, i.e. physical address, is examined from the page table and then the logical address is converted into the physical address. The page table is stored in a memory operable at very high speed or an associative memory to minimize the time necessary for the overhead.

The mapping hardware is costly and therefore is undesirable for a low cost minicomputer. Only the index register, i.e. general register, relates to the addressing. For this, the program to be used must be simple in construction and thus it is very difficult to use a flexible program such as reentrant.

Further, if the displacement is constructed by 16 bits, it is impossible to specify an address with memory capacity of 64 K bytes or more.

One of the address systems which has succeeded is solving the above-mentioned problems is described in a manual issued by IBM corporation, GA22-7000-4 IBM SYSTEM/370 principles of operation TNL:GN22-0498, pages 21 to 22. In the addressing, an instruction consists of 32 bits, as shown in FIG. 4. Bit 0 to bit 7 are assigned to the operation code 31 and bit 8 to bit 11 to the register operand 32 denoted as R1, and bit 12 to bit 31 to the address operand 2. The address operand 2 is further divided into an idex modification field 33 denoted as X2 assigned to bit 12 to bit 15, a base modification field 34 denoted as B2 assigned to bit 16 to bit 19 and a displacement 35 denoted D2 assigned to bit 20 to bit 31. In addressing of the instruction, the logical address specified in the displacement is added to the contents of the general register specified by the index modification field 33 and then the result of the addition is added to the contents of the general register specified by the base modification field 34, with the result that a physical address is formed. However, when a more flexible program, i.e. a relocatable program, or a reentrable program is prepared or a logical memory capacity exceeding the physical memory capacity of a computer must be prepared, the index modification of the above instruction format provides an insufficient result and this creates problems in programming.

SUMMARY OF THE INVENTION

Accordingly, an object of the invention is to provide a data processor in which the addressing function is expandable and the memory capacity is increased.

To achieve the above-mentioned object, there is provided a data processor comprising: a main memory; a memory address register which is connected through a memory bus to the main memory and to a source bus, and in which an address to make an access to the main memory is latched; a memory data register which is connected through the memory bus to the main memory and to the source bus, and in which data read out from the main memory or to be loaded into the main memory is latched in accordance with an address latched in the memory address register; a program status word which is connected to the source bus and the destination bus and in which interruption levels and condition flags are set; an instruction buffer register which is connected through the memory bus to the main memory and stores an instruction read out from the main memory, said instruction including a plurality of address modification fields and a field for selecting these address modification fields; an instruction register which is connected through an instruction bus to the instruction buffer register and stores the instruction; instruction judging control means which is connected through an instruction buffer bus to the instruction register and judges the instruction stored in the instruction register to produce microinstructions corresponding to the instruction; a microprogram control unit connected to the instruction judging control means to control the microinstructions outputted from the instruction judging control means; a working register connected to the source bus and the destination bus and used as a temporary buffer in execution of the microinstructions; and address modifying means for performing a given address modification on the basis of the result of judgement made by the instruction judging control means as to the field for selecting the address modification fields.

Other objects and features of the invention will be seen by reference to the description taken in connection with the accompanying drawings, in which:

BRIEF DESCRIPTION OF THE DRAWINGS

FIG. 13A shows a functional flow chart for illustrating one of the relative address modifications;

FIG. 13B shows a functional flow chart for illustrating a relative address modification.

DESCRIPTION OF THE PREFERRED EMBODIMENTS

Figure 1:
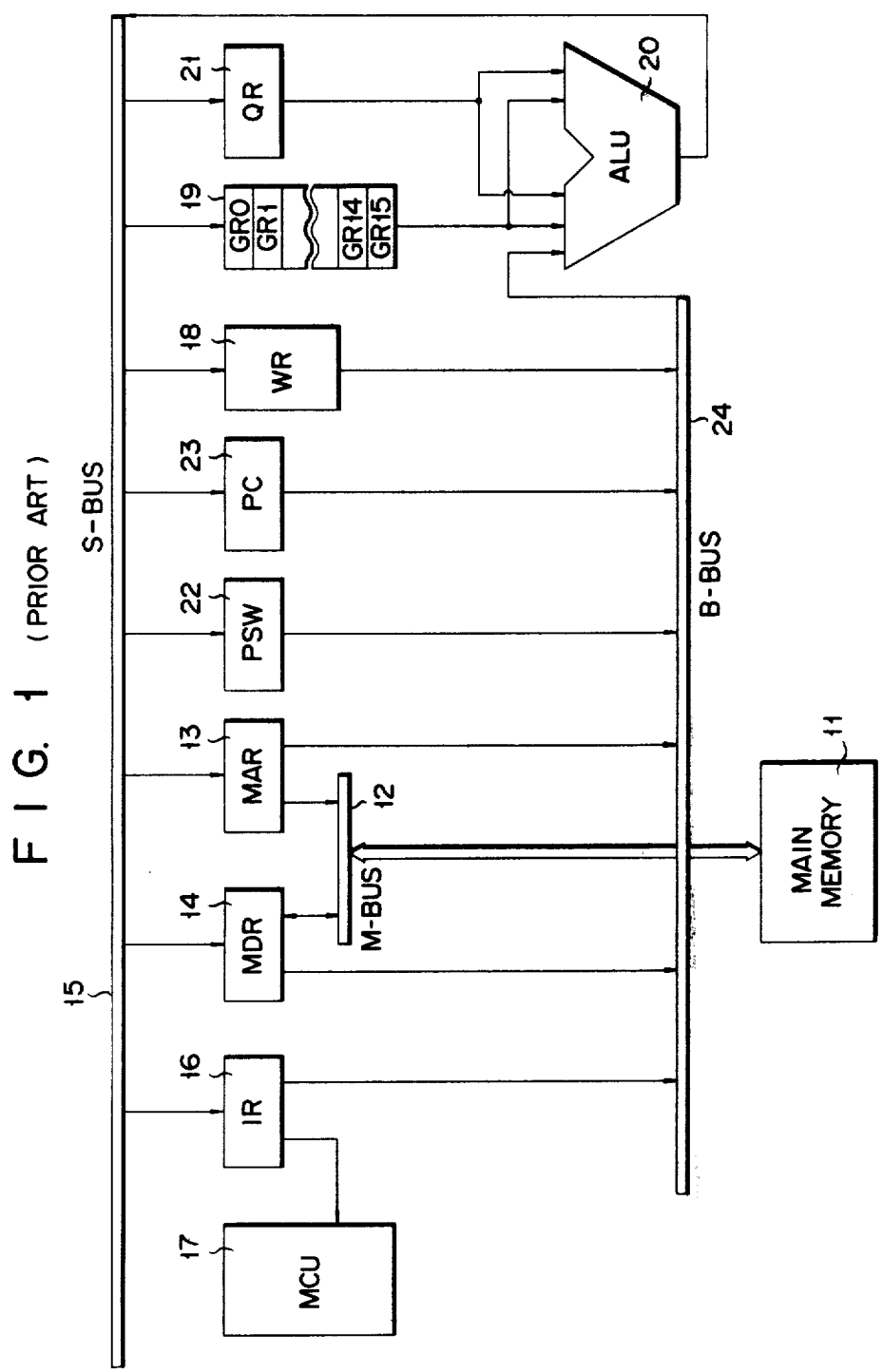
FIG. 1 shows a block diagram of a conventional typical data processor.
Figure 2:
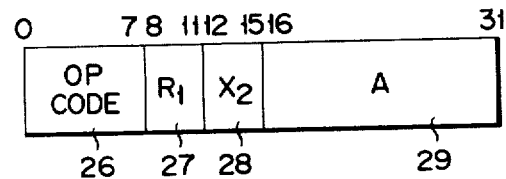
FIG. 2 shows a format of an instruction used in the data processor in FIG. 1.
Figure 3:
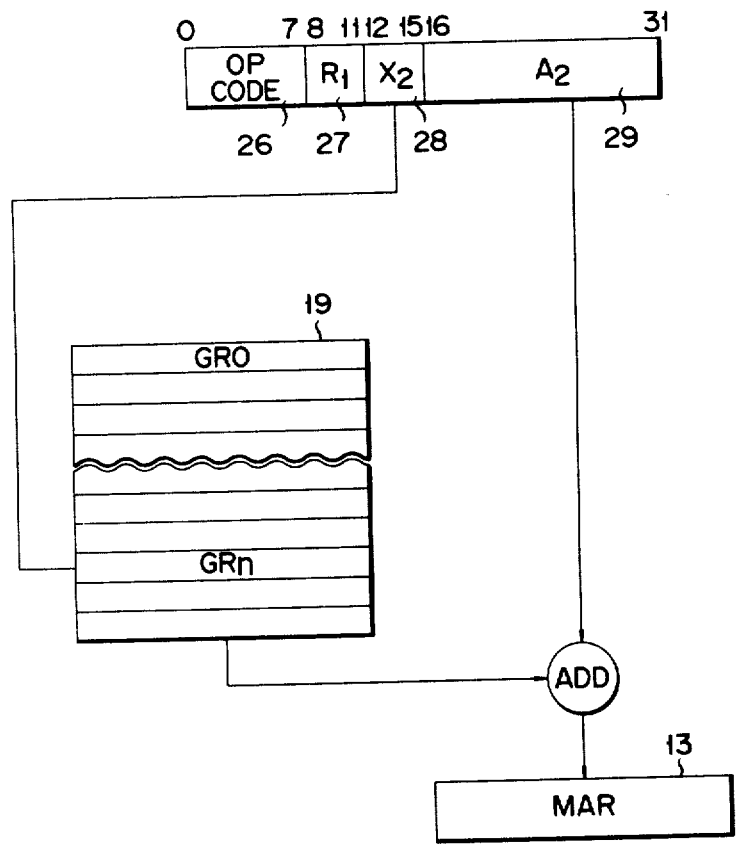
FIG. 3 shows a flow chart for illustrating an addressing operation of the prior art.
Figure 4:
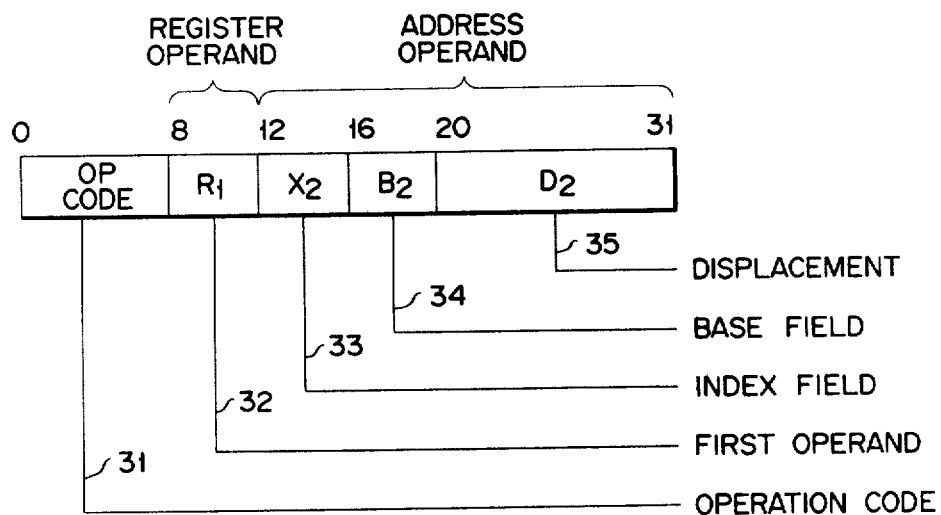
FIG. 4 shows another format of an instruction used in the conventional data processor.
Figure 5:
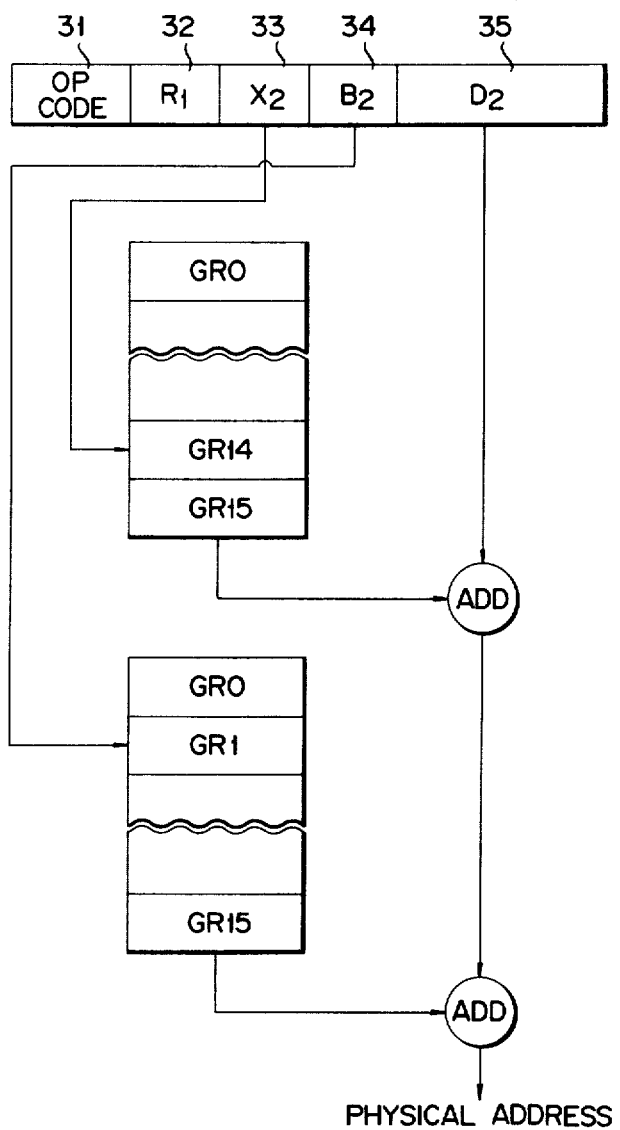
FIG. 5 shows a flow chart for illustrating an addressing operation when the instruction in FIG. 4 is used.
Figure 6:
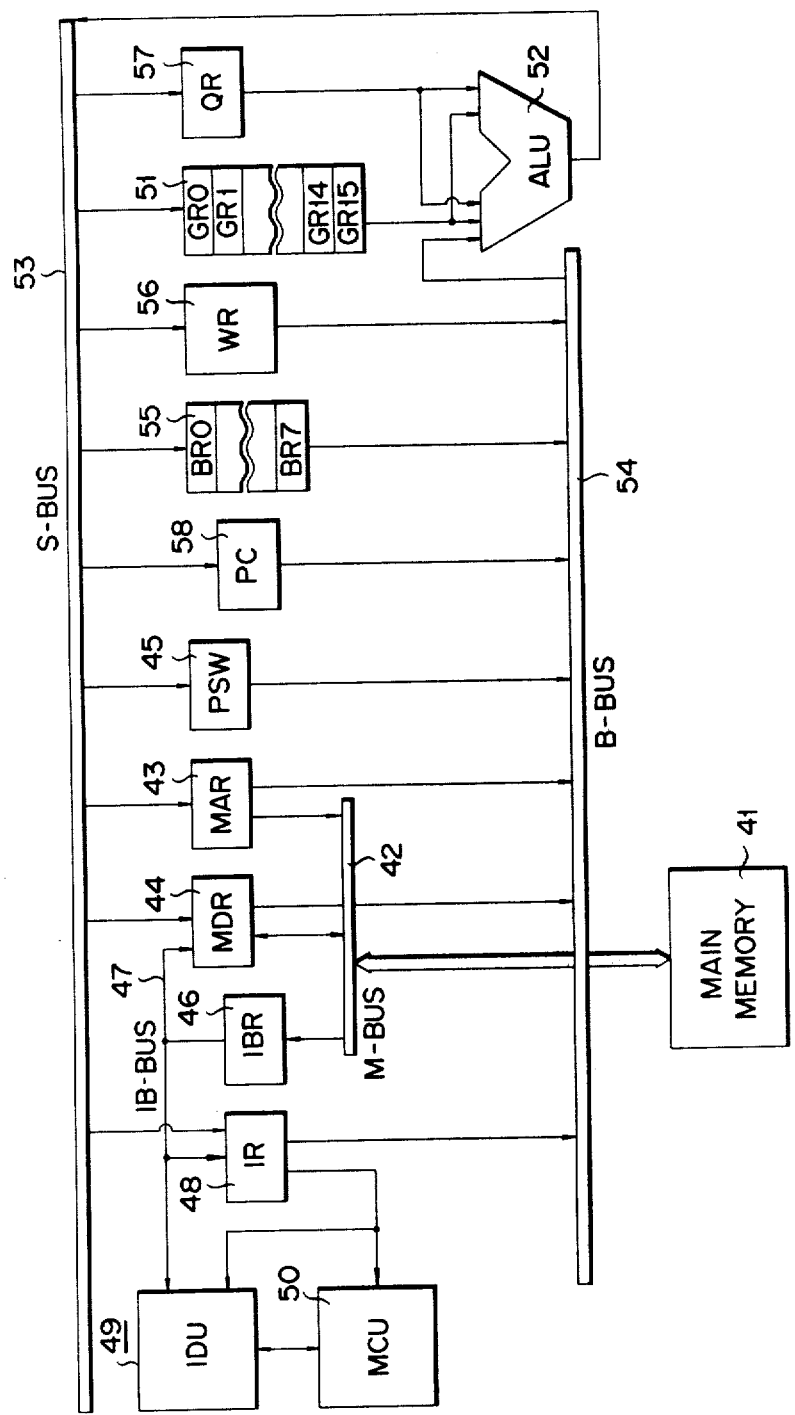
FIG. 6 shows a block diagram of a data processor according to the invention.

Referring now to FIG. 6, there is shown an embodiment of a data processor according to the invention. In the figure, a main memory 41 is coupled with a memory bus (M-BUS) 42. Between the M-BUS 42 and the source bus (S-BUS) 53 is inserted a memory address register (MAR) 43. The MAR 43 stores an address of the main memory 41. A memory data register (MDR) 44 is connected between the M-BUS 42 and the S-BUS 53. The MDR 44 stores data read out or loaded from and to the main memory 41. The MDR 44 is connected to an instruction buffer bus (IB-BUS) 47. An instruction buffer register (IBR) is designated by reference numeral 46. The IBR 46 is connected between the S-BUS 53 and the destination bus (B-BUS) 54 and to the IB-BUS 47. An instruction code from the main memory 41 is loaded into the IBR 46 through the M-BUS 42. The instruction code stored in the IBR 46 is loaded into an instruction register (IR) 48 by way of the IB-BUS 47. An instruction decoding unit (IDU) 49 is connected to the IB-BUS 47 and decodes the instruction loaded in the IR 48. A microprogram control unit (MCU) 50 controls the operation of a microprogram in accordance with an instruction from the IDU 49. The MCU 50 and the IR 48 are connected to each other. A general register 51 which is connected to the S-BUS 53 is comprised of 16 registers GR0 to GR15. In the general register, the registers GR0 to GR8 are used as arithmetic registers, data registers, or the like. The remaining registers GR9 to GR15 are used as index registers, for example. An arithmetic and logic unit (ALU) 52 is connected to the B-BUS 54 and the general register 51 and to a quotient register 57 to be referred to later and performs various arithmetic operations and logical operations. A quotient register (QR) is connected to the S-BUS 53 and the ALU 52 and temporarily stores the result before or after the operation of the ALU 52. A program status word (PSW) 45 is a register connected to the S-BUS 53 and the B-BUS 54 and stores interrupt levels or various flags such as a carry flag, a sign flag or a zero flag, when a program is executed. A program counter 58 is connected to the S-BUS 53 and the B-BUS 54 and stores an address of the instruction to next be executed. A base register 55 connected to the S-BUS 53 and the B-BUS 54 is comprised of 8 registers BR0 to BR7. The base register 55 stores a base address and separately addresses individual program or data areas. A working register 56 is connected to the S-BUS 53 and the B-BUS 54 is used as a temporary buffer when microinstructions of the microprogram are executed. Each of the above-mentioned registers are each comprised of 32 bits.

Figure 7:
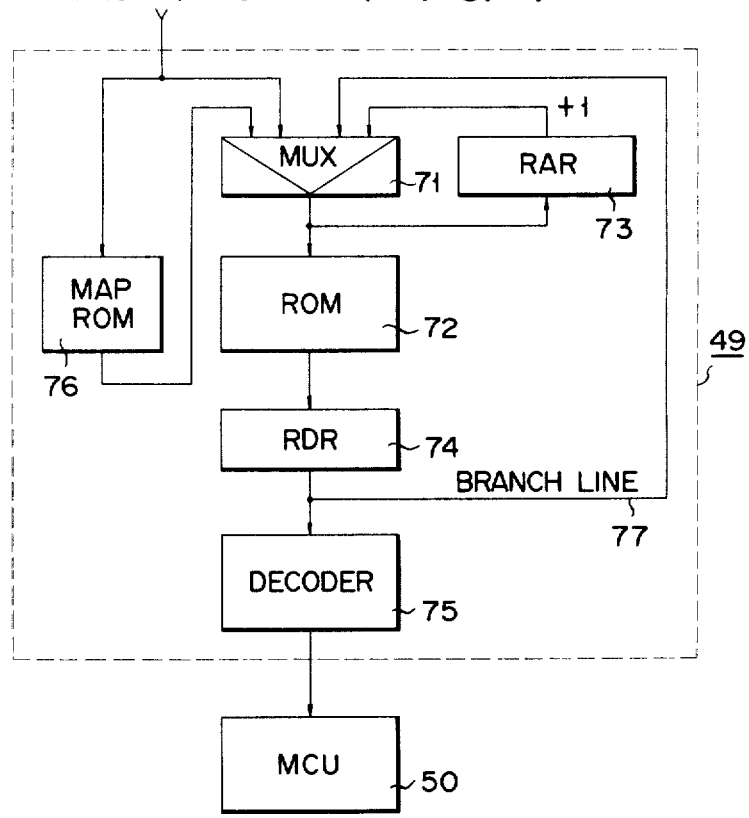
FIG. 7 shows a block diagram of an instruction decoding unit.

The details of the instruction decoding unit 49 will be described with reference to FIG. 7. In the figure, a multiplexer 71 is connected at one of the input terminals to the IR 48 through the IB-BUS 47. The output terminal of the multiplexer 71 is connected to the input terminal of a read only memory 72 (ROM) and to a read only memory address register 73 (RAR). The output terminal of the RAR 73 is connected to one of the input terminals of the multiplexer 71. The output terminal of the ROM 72 is connected to the input terminal of a read only memory data register 74 (RDR). The output terminal of the RDR 74 is coupled with the input terminal of the decoder 75, and to one of the input terminals of the multiplexer 71, through a branch line 77. The IR 48 is connected to the input terminal of a mapping read only memory 76 (MAP ROM) through the IB-BUS 47. The output terminal of the MAP ROM 76 is connected to one of the input terminals of the multiplexer 71.

The operation of the instruction decoding unit 49 will be given below.

Assume now that there are two kinds of user instructions; one user instruction corresponding to one microinstruction and the other corresponding to a plurality of microinstructions. For example, an operation code is "30 (hexadecimal)". The operation code "30" makes an access to the address "30 (hexadecimal)" of the ROM 72 through the MUX 71. The contents of the address "30", i.e. one microinstruction, is read out from the ROM and is latched in the RDR 74. The microinstruction completes through one microinstruction step so that it is sent to the decoder 75. The decoder 75 decodes the microinstruction to deliver a control information to the MCU 50.

Let's now consider a case where the user instruction is composed of a plurality of microinstructions, i.e. a plurality of microinstruction steps, and the operation code of the user instruction is "40 (hexadecimal)". The address "40" of the ROM 72 is addressed through the MUX 71 and the contents of the address is latched in the RDR 74 and then applied to the decoder 75 where it is decoded. The decoded one is outputted as a control signal from the decoder. Then, the RAR 73 increments the address "40" to make an access to the address "41 (hexidecimal)" of the ROM 72. Similarly, the contents of the address read out is latched in the RDR 74 and then is decoded by the decoder 75. Upon the decoding, the decoder produces a control signal toward the MCU 50. The address is again incremented by the RAR 73 to access the address "42" of the ROM 72. A similar processing follows. Finally, a control information is delivered to the MCU 50.

When one user instruction corresponds to several tens microinstruction steps, the MAP ROM 76 is used.

Assume now that a user instruction is a multiplication instruction and the operation code of the instruction is "50 (hexadecimal)". In this case, the address "50" of the ROM 72 is specified through the MUX 71. The contents of the address "50" is read out and then is latched in the RDR 74. The instruction latched is decoded by the decoder 75 and then is delivered as a control information from the decoder to the MCU 50. Following this, the MAP ROM 76 is referred to. The reference of the MAP ROM 76 is made when a map bit included in the one microinstruction is logical "1". The address of the MAP ROM 76 to be addressed is specified by the operand field of the microinstruction. If the address is "30 (hexadecimal)", for example, the address "30 (hexadecimal)" of the MAP ROM 76 is accessed and the contents of the address is the address to be next addressed. When the contents of the MAP ROM 76 is "200 (hexadecimal)", the address "200 (hexadecimal)" of the ROM 72 is accessed, in which a second microinstruction of the multiplex routine is stored. The microinstruction is latched in the RDR 74 and then is processed as mentioned above.

When a user instruction is a branch instruction and the operation code is "60 (hexadecimal)", the address "60 (hexadecimal)" of the ROM 72 is accessed. And if the contents of the address is "300 (hexadecimal)", the "300" is transferred to the MUX 71 through the branch line 77 to make an access to the address "300" in the ROM 72.

Figure 8:
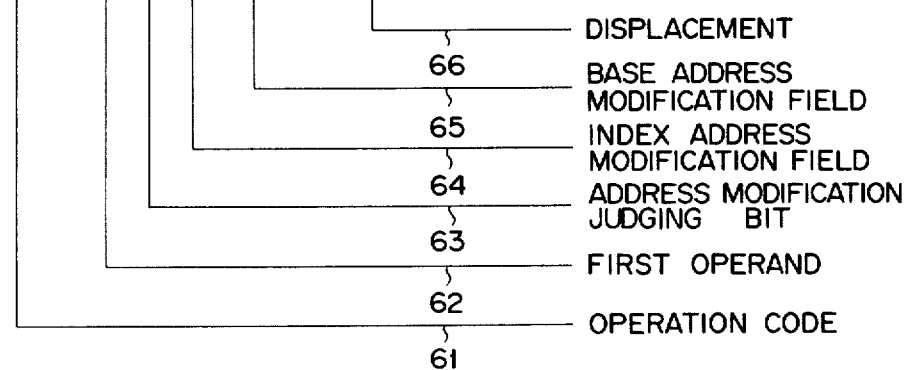
FIG. 8 shows a format of an instruction with base address modification executed in the data processor shown in FIG. 6.

Referring now to FIG. 8, there is shown a format of an instruction word used in the data processor in FIG. 6. The instruction has two operands and consists of 32 bits. The bit 0 to bit 7 are assigned to an operation code 61 to instruct an operation that the computer executes, such as read or write operation, arithmetic operation, data transfer or the like. The bit 8 to bit 11 are assigned to a first operand R1 62. Designated by the first operand R1 62 is one of the general registers GR0 to GR7. (The general registers GR8 to GR15 are assigned to index registers). When the bit pattern specified by the first operand R1 62 is 0000, the general register GR0 is selected. When it is 0001, the general register GR1 is selected. Similarly, the register GR7 is selected for 0111 of the bit pattern. The bit 12 is assigned to an address modification judging bit S 63. When the address modification judging bit S is 0, that is, the logical state is 0, it represents a base address modification. When S=1, that is, the logical state is 1, it represents a relative address modification. The bit 13 to bit 15 are assigned to an index address modification field X2 64. The index address modification field X2 64 specifies one of the general registers GR8 to GR15 allocated to the index registers. When the bit pattern specified by the index modification field 64 is 001, the general register GR9 is selected. When it is 111, the register GR15 is selected. For the selected operation of the general registers GR9 to GR15, one bit is attached to the beginning of the bit pattern. For example, the bit pattern 001 becomes 1001; the bit pattern 010 becomes 1010; 111 becomes 1111. When the bit pattern is 000, no index address modification is performed.

The bit 16 to bit 18 are assigned to a base address modification field B2 65. The base address modification field 65 specifies any one of the base registers 55 BR0 to BR7. When the bit pattern specified in the base address modification field is 000, the base register BR0 is selected. The bit pattern 001 selects the base register BR1. The 111 selects the register BR7. The displacement D2 66 is assigned to bit 19 to bit 31. The displacement 66 designates a logical address. In this example, the displacement 66 consists of 13 bits so that it can specify the addresses up to 1FFF (hexadecimal).

Figure 9:
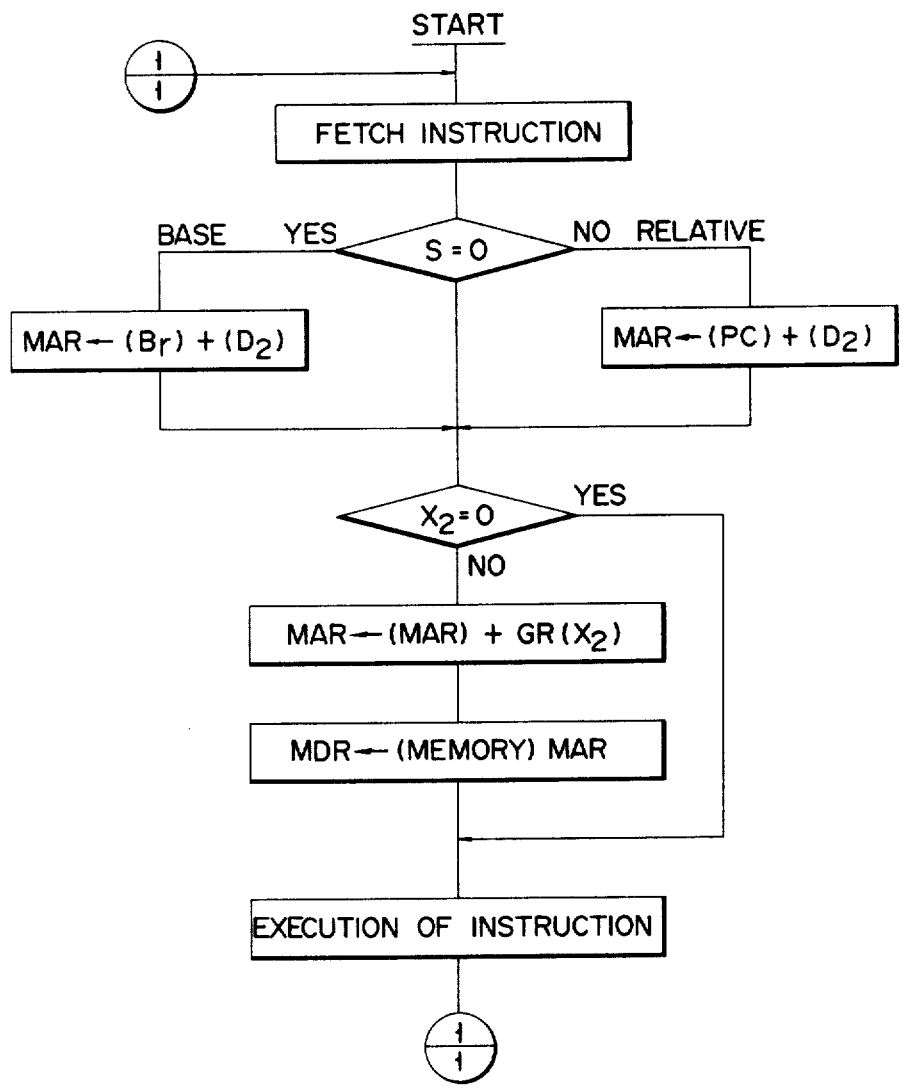
FIG. 9 shows a functional flow chart for illustrating an address modification of an instruction shown in FIG. 8.
Figure 10:
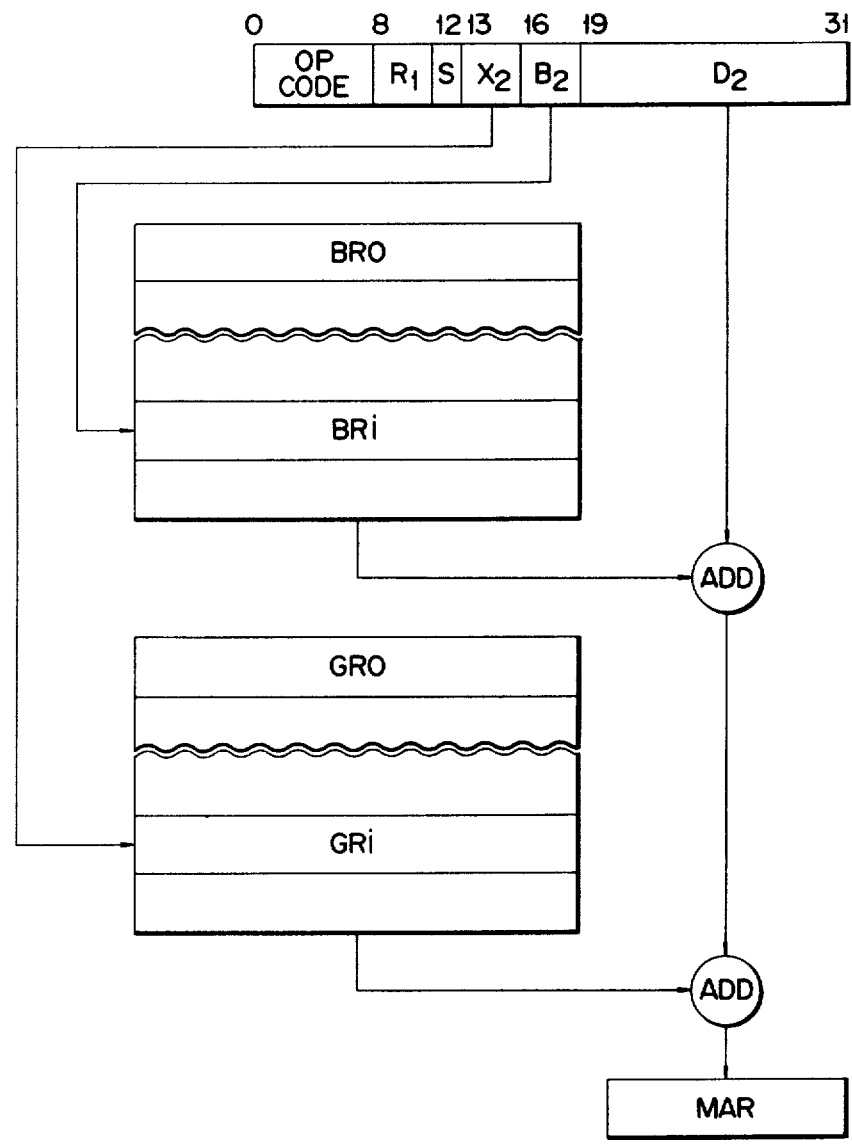
FIG. 10 shows a flow chart for illustrating a base address modification.
Figure 11:
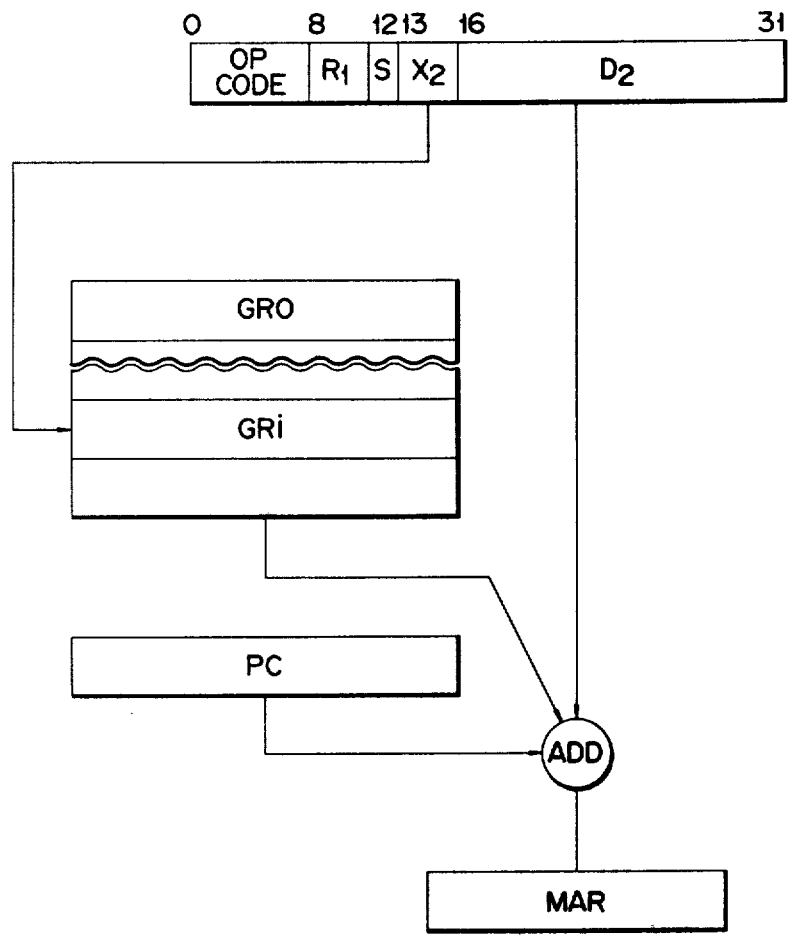
FIG. 11 shows a flow chart for illustrating a relative address modification.

The operation of the data processor thus constructed will now be given referring to FIG. 9, FIG. 10 and FIG. 11.

An instruction is first fetched from the main memory 41. The instruction fetched is loaded into the IBR 46 through the memory bus 42. The operation code 61, first operand R1 62, address modification judging bit S 63, index address modification field X2 64, and base address modification field B2 65 in the instruction are loaded into the IR 48 through the IB-BUS 47 from the IBR 46. The instruction stored in the IR 48 is decoded by the IDU 49. In other words, the address modification judging bit S 63 is judged. When the address modification judging bit S 63 is 0, S=0, the base address modification is accomplished. More precisely, the contents of the base register specified by the base address modification field 65 is added to the contents of the displacement 66 registered in the IBR 46 by the ALU 52. In this case, however, it is assumed that the address to be address-modified is previously set in the base register specified. Then, the index address modification field 64 is judged by the IDU 49. If the index modification field 64 is zero, i.e. 000 bit pattern, no index address modification is performed. In other words, the index address modification is carried out when the bit pattern specified in the index address modification field X2 64 is other than 000. In the index address modification, the contents of the general register GR (X2) specified in the index address modification field X2 64 (any one of the general registers GR9 to GR15 is selected) is added to the logical address designated in the displacement D2 66 in the ALU 52. The result of the addition is registered in the MAR 43 (see FIG. 10). The contents of the physical address loaded from the main memory 41 to the MAR 43 is loaded into the MDR 44. Then, the contents of the physical address is executed in accordance with the operation code 61 of the instruction. When the address modification judging bit is 1, S = 1, the relative address modification is performed. In the relative address modification, the contents of the program counter 58 is added to the contents of the displacement, or the logical address by the ALU 52. Then, the index address modification field 64 is judged. When the contents of the field is bit pattern of 000, the index address modification is not performed. When the contents of the field 64 is other than bit pattern of 000, the general register corresponding to it is selected. For example, if the field 64 is bit pattern of 001, the general register GR9 is selected. If the contents of the field 64 is bit pattern of 111, the general register GR 15 is selected. The contents of the general register is added to the value of the addition mentioned above by the ALU 52, thus resulting in formation of a physical address (see FIG. 11). Then, the contents of the physical address stored in the MAR 43 is read out and loaded into the MDR 44. The execution of the instruction to follow is conducted in accordance with the operation code.

The above-mentioned addressing will be detailed with reference to FIGS. 12 and 13.

Figure 12A:
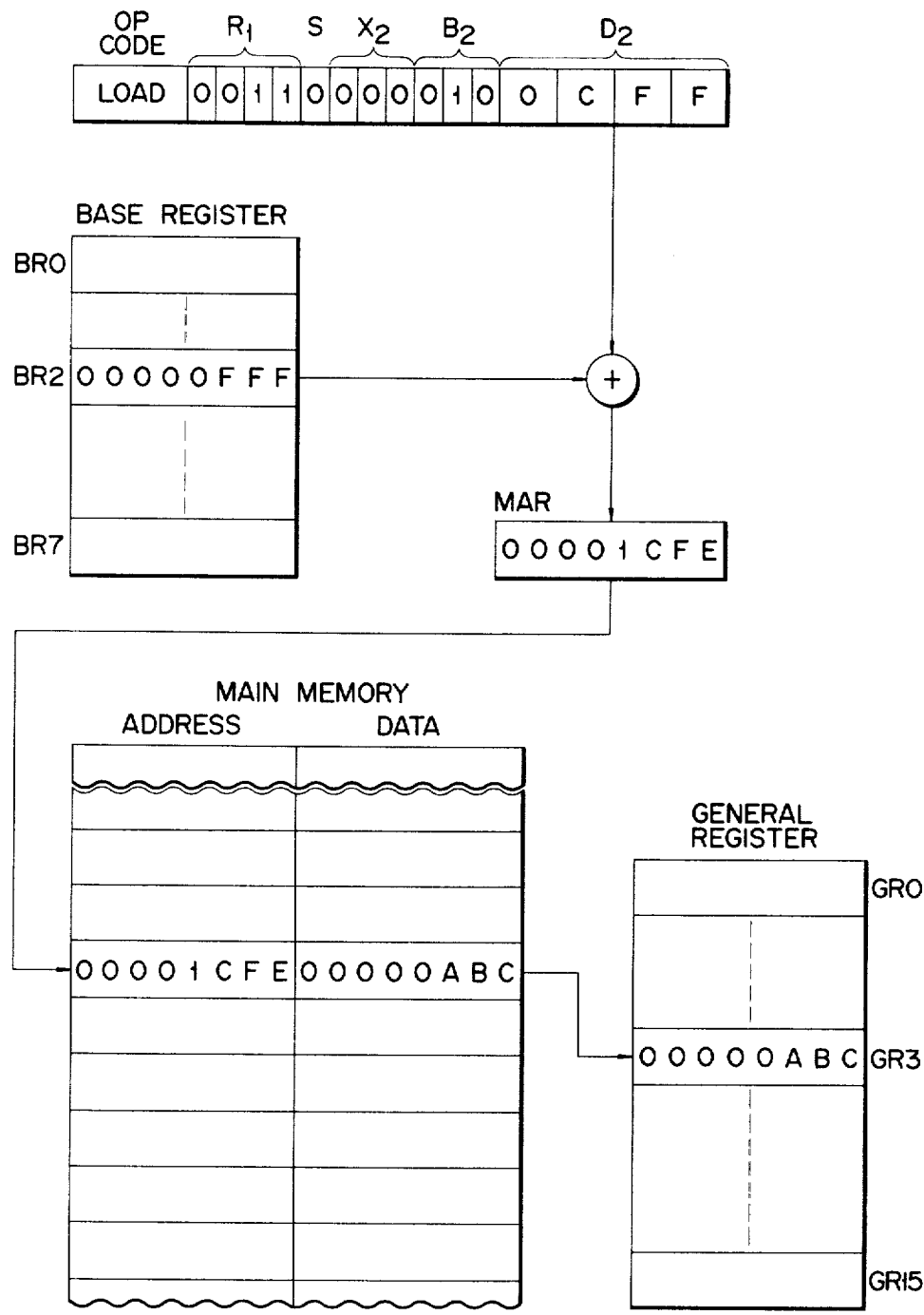
FIG. 12A shows a functional flow chart for illustrating one of the base address modifications.

An example of the addressing in the case of the base modification is shown in FIG. 12A. As shown, a LOAD instruction is the contents of the operation code of the instruction word; 0011 (binary) the first operand R₁; 0 the address modification judgement bit S; 000 (binary) the index address modification field X2;010 (binary) the base address modification field B2; 0CFF (hexadecimal) the displacement D2. In the instruction thus constructed, the address modification judgement bit S is 0 so that the operation step to follow is the base address modification. Because of the 010 of the base address modification field B2, the base register BR2 is selected. Assume now that the BR2 stores 00000FFF (hexadecimal). The 0CFF of the displacement D2 is added to the 00000FFF of the BR2 thereby to produce 00001CFE (hexadecimal). Because of 000 of the index address modification field X2, no index address modification is carried out. Accordingly, the final effective address is 00001CFE (hexadecimal). The 00001CFE (hexadecimal) is then set in the MAR 43. The main memory 41 is then accessed and the data 00000ABC (hexadecimal) is loaded into the general register GR3 specified by the first operand R1.

Figure 12B:
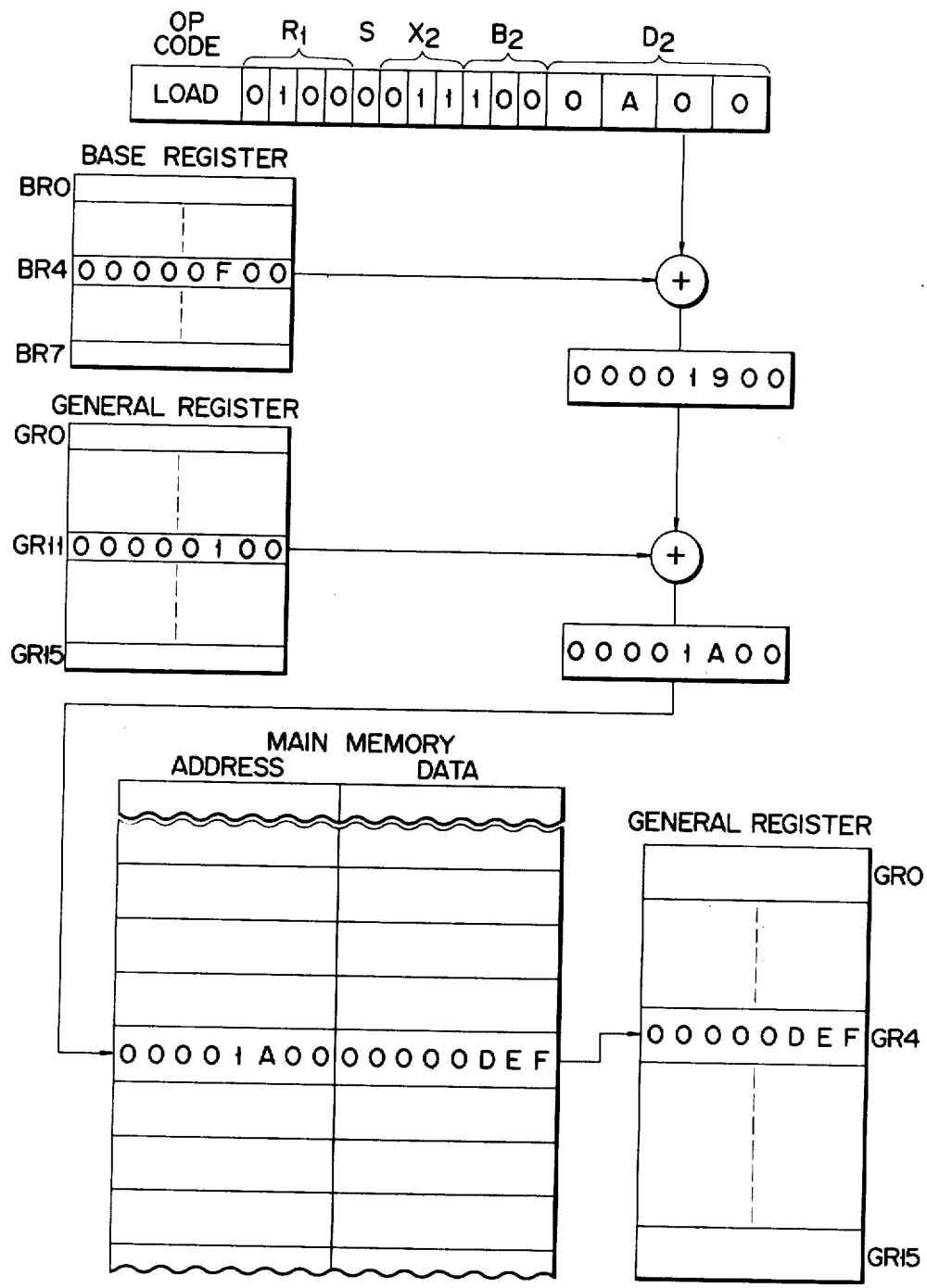
FIG. 12B shows a functional flow chart for illustrating another base address modification.

FIG. 12B is an example of the addressing in the case of the base address modification. A current instruction contains the information as shown in FIG. 12B; LOAD instruction in the OP code, 0100 (binary) in the first operand R1, 0 in the address modification judgement bit S, 011 (binary) in the index address modification field X2, 100 in the base address modification field B2, 0A00 (hexadecimal) in the displacement D2. In this case, since the address modification judging bit is 0, the base address modification follows. The 100 (binary) in the base address modification field B2 selects the base address register BR4. When the base address register BR4 selected stores 00000F00 (hexadecimal), it is added to 0A00 (hexadecimal) of the displacement D2 to obtain 00001900 (hexadecimal). The 011 (binary) in the index address modification field X2 selects the general register GR11. The contents, for example, 00000100 (hexadecimal) of the general register GR11 is added to the 00001900 (hexadecimal) to obtain 00001A00 (hexadecimal). Accordingly, in this case, the base address modification and the index address modification are both performed and the final effective address is 00001A00 (hexadecimal). The effective address is set in the MAR 43. By the effective address, the address 00001A00 (hexadecimal) is accessed with the result that data of 00000DEF (hexadecimal) is loaded into the GR4 general register.

FIG. 13A is an example of the addressing in the case of the relative address modification. In an instruction word, the operation code is filled with a LOAD instruction; the first operand R1 with 0101 (binary); the address modification judging bit S with 1; the index address modification field X2 with 000 (binary); the displacement D2 with 0000111111110000 (binary), as shown in FIG. 13A. Since the address modification judging bit S is 1, the operation to follow is the arrangement of the relative address modification. In the operation, the logical address 0000111111110000 (binary) specified by the displacement D2 is added to the address 00000100 (hexadecimal) thereby to obtain 000010F0 (hexadecimal). Since the contents of the index modification field X2 is 000, the index address modification is not performed. The effective address finally obtained is 000010F0 (hexadecimal). The address is set in the MAR 43. By the address, the main memory is accessed and the data 0000ABCD (hexadecimal) read out is loaded into the general register GR5 specified by the first operand R1.

FIG. 13B shows another example of addressing in the case of the relative address modification. The operation code contains a LOAD instruction; the first operand R1 0110 (binary); the address modification judging bit S is 1; the index address modification field X2 is 100 (binary); the displacement D2 is 1000000100000000 (binary).

In operation of the relative address modification, the first step is the execution of the relative address modification since S32 1. The logical address 1000000100000000 (binary) specified by the displacement D2 is added to the address 00000FF0 (hexadecimal) set in the program counter. In this case, since one bit in the high order bits (sign bit) of the logical address specified by the displacement D2 is 1, the address value is negative. As a result, it is shifted toward the small address by the value presented by the program counter. That is, the address resulting from the addition is 00000EF0 (hexadecimal).

The 100 (binary) in the index modification field X2 selects the general register GR12 storing 000000F0 (hexadecimal), for example. The effective address is further shifted by the contents of the general register GR12 and thus the finally obtained address is 00000E00 (hexadecimal) which in turn is stored in the MAR 43. Then, the address 00000E00 (hexadecimal) in the main memory 41 is addressed so that data of 0000CDEF (hexadecimal) in the address is read out therefrom and is loaded into the general register GR6 specified by the first operand R₁.

As seen from the foregoing, in the data processor according to the invention, the relative address modification and the base address modification are both packed in a single instruction and the address modification judging bit selects one of these modifications. With such a construction, the function of the addressing is expanded so that the programs with flexible construction may readily be prepared such as relocatable program or reentrable program. Further, since 13 bits from bit 19 to bit 31 are used for the displacement, the logical addresses may be specified to the number of 8192 addresses. This indicates that the logical memory space is expanded by the number of approximately 4 Kbytes, as compared to the conventional one. In the relative modification, 16 bits from bit 16 to bit 31 are assigned to the displacement so that the logical addresses may be expressed by 15 bits except one bit for sign. This also indicates that the logical memory space is expanded by =32 Kbytes, compared to the conventional one.

Having described a specific embodiment of our invention, it is believed obvious that modification and variation of our invention is possible in light of the above teachings.

What we claim is:

1. In a data processor having a main memory; a memory address register which is connected to said main memory through a memory bus and to a source bus and in which an address to access said main memory is latched; a memory data register which is connected through the memory bus to said main memory and to the source bus and in which data read out from said main memory or to be loaded into the same is latched in accordance with the address latched in said memory address register; a program status word which is connected to the source bus and a destination bus and in which interrupt levels and condition flags are set; wherein the improvement comprises:
 an instruction buffer register which is connected through the memory bus to said main memory and stores an instruction read out from said main memory, said instruction including a plurality of address modification fields and a field for selecting one of these address modification fields;
 an instruction register which is connected through an instruction buffer bus to said instruction buffer register and stores the instruction;
 instruction judging control means which is connected through the instruction buffer bus to said instruction register and judges the instruction stored in said instruction register to produce microinstructions corresponding to the instruction;
 microprogram control unit connected to said instruction judging control means to control the microinstructions outputted from said instruction judging control means;
 a working register connected to the source bus and the destination bus and used as a temporary buffer in execution of the microinstructions; and
 address modifying means for performing a desired address modification on the basis of the result of judgment by said instruction judging control means as to the field for selecting either of the address modification fields.

2. A data processor according to claim 1, in which said instruction judging control means is comprised of:
 a multiplexer which receives a plurality of input signals and selectively produces an output signal;
 a first read only memory which is connected to the output terminal of said multiplexer to read out microinstructions stored in said first read only memory from said first read only memory by the output signal from said multiplexer;
 a read only memory data register for latching the microinstruction read out from said first read only memory;
 a decoder which is connected to the output terminal of said read only memory data register and decodes the instruction latched in said read only memory data register'
 a read only memory address register which is connected to said multiplexer and increment or decrement an address to make an access to said read only memory;
 a second read only memory which is connected to said multiplexer, stores therein the address to access to said first read only memory and selectively produces the address to make an access to said first read only memory based on the microinstruction read out from said first read only memory.

3. A data processor according to claim 1, in which said address modifying means is comprised of:
 a program counter which is connected to said source bus and said destination bus, and stores the address of the next instruction to be performed and of which the contents are added to a logical address in a relative address modification;
 a plurality of base register which is connected to the source bus and the destination bus and of which the contents are added to the logical address in a base address modification;
 a plurality of base registers which is connected to the source bus and of which the contents are added to the logical address in the index address modification; and
 an arithmetic and logic unit which is connected to said destination bus and said general registers and performs said addition operation in the relative address, base address and index address modifications.

4. A data processor according to claim 1, in which said instruction including the address modification fields and the field to select either of these modification fields includes:
 an operation code;
 a first operand for storing the result of an operation executed by said operation code;
 a displacement for specifying the logical address;
 a base address modification field for basemodifying the logical address specified by said displacement;
 an index address modification field for indexmodifying the logical address specified by said displacement;
 an address modification judging field for selecting either relative address modification or base address modification.

5. A data processor according to claim 4, in which said address modification judging field is comprised of one bit and, when the bit has one value, the relative address modification is performed and, when the bit has the other value, the base address modification is performed.

6. A data processor according to claim 5, in which, in the relative address modification, the logical address specified by said displacement is added to the contents of said program counter and the contents of a general register specified by said index address modification field is added to the result of the addition.

7. A data processor according to claim 5, in which the bit length of the displacement in the case of said relative address modification is expandable up to the base address modification field.

8. A data processor according to claim 5, in which, in the base address modification, the logical address specified by said displacement is added to the contents of said base register specified by said base address modification field and the contents of the general register specified by said index address modification field is added to the result of the addition.

9. A data processor according to claim 7, in which the highest order bit of the displacement is a sign bit.

* * * * *